US008618471B2

(12) United States Patent
Steadman et al.

(10) Patent No.: US 8,618,471 B2
(45) Date of Patent: Dec. 31, 2013

(54) APPARATUS, IMAGING DEVICE AND METHOD FOR DETECTING X-RAY RADIATION

(75) Inventors: Roger Steadman, Eindhoven (NL); Guenter Zeitler, Eindhoven (NL); Christoph Herrmann, Eindhoven (NL); Christian Baeumer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 958 days.

(21) Appl. No.: 12/446,758

(22) PCT Filed: Oct. 22, 2007

(86) PCT No.: PCT/IB2007/054283
§ 371 (c)(1),
(2), (4) Date: Dec. 18, 2009

(87) PCT Pub. No.: WO2008/050283
PCT Pub. Date: May 2, 2008

(65) Prior Publication Data
US 2010/0086100 A1    Apr. 8, 2010

(30) Foreign Application Priority Data
Oct. 25, 2006   (EP) .................................... 06122933

(51) Int. Cl.
*G12B 13/00* (2006.01)
*G01J 1/42* (2006.01)

(52) U.S. Cl.
USPC ...................... 250/252.1; 250/336.1; 250/395

(58) Field of Classification Search
USPC .......... 250/252.1, 336.1, 395; 327/13, 15, 58, 327/60, 63, 72, 77
See application file for complete search history.

(56) References Cited

U.S. PATENT DOCUMENTS

| 4,618,775 A | 10/1986 | Persyk et al. |
| 6,756,587 B1 | 6/2004 | Bateman et al. |

(Continued)

FOREIGN PATENT DOCUMENTS

| GB | 1154825 | 6/1969 |
| JP | 63127180 A | 5/1988 |

(Continued)

OTHER PUBLICATIONS

Fiorini, C., et al.; First Experimental Characterization of ROTOR: the New Switched-current VLSI Amplifier for X-ray Spectroscopy with Silicon Drift Detectors; 2000; IEEE Trans. on Nuclear Science; 47(3)823-828.

(Continued)

*Primary Examiner* — David Porta
*Assistant Examiner* — Carolyn Igyarto

(57) ABSTRACT

The invention is directed at an apparatus (10), an imaging device and a method for detecting X-ray photons, in particular photons (32,34) in a computer tomograph. Photons (32, 34) are converted into an electrical pulse and compared against a threshold using a discriminator (20). The electrical network (12) performing these functions comprises a switching element (28), that can modify the electrical path (22) along which the process signals travel. The trigger signal ($V_T$) for actuating the switching element (28) is derived from an electrical state of the electrical path (22). If a pulse associated to a photon (32,34) is detected, the switching element (28) is actuated in order to avoid that the processing of the charge pulse stemming from a first photon (32) is affected by a subsequent second photon (34).

14 Claims, 6 Drawing Sheets

(56) References Cited

U.S. PATENT DOCUMENTS

| | | |
|---|---|---|
| 6,768,356 B1 | 7/2004 | Wu et al. |
| 2005/0175349 A1 | 8/2005 | Guyer et al. |
| 2005/0253076 A1 | 11/2005 | Wollenweber et al. |

FOREIGN PATENT DOCUMENTS

| | | |
|---|---|---|
| JP | 01132984 A | 5/1989 |
| JP | 03073882 A | 3/1991 |
| JP | 05180944 A | 7/1993 |
| JP | 2004325183 A | 11/2004 |
| JP | 2005274169 A | 10/2005 |
| WO | 0192914 A2 | 12/2001 |
| WO | 0222018 A2 | 3/2002 |
| WO | 03040757 A2 | 5/2003 |

OTHER PUBLICATIONS

Lewellen, T. K., et al.; Evaluation of a Clinical Scintillation Camera with Pulse Tail Extrapolation Electronics; 1989; The Journal of Nuclear Medicine; 30(9)1554-1558.

Zappa, F., et al.; Fully-Integrated Active-Quenching Circuit for Single-Photon Detection; 2002; ESSCIRC; 4 pages.

APPARATUS, IMAGING DEVICE AND METHOD FOR DETECTING X-RAY RADIATION

FIELD OF THE INVENTION

The present invention relates to an apparatus, an imaging device and a method for detecting X-ray photons, in particular photons in a computer tomograph.

BACKGROUND OF THE INVENTION

Computer tomography (CT, also called computed tomography) has evolved into a commonly used means, when it comes to generating a three-dimensional image of the internals of an object. The three-dimensional image is created based on a large number of two-dimensional X-ray images taken around a single axis of rotation. While CT is most commonly used for medical diagnosis of the human body, it has also been found applicable for non-destructive materials testing. Detailed information regarding the basics and the application of CT, can be found in the book "Computed Tomography" by Willi A. Kalender, ISBN 3-89578-216-5.

One of the key innovative aspects in future CT and XR imaging is the energy-resolved counting of the photons which are let through or transmitted by the object being analyzed when being exposed to X-ray radiation. Depending on the number and energy the transmitted photons have, it can be concluded through which type of material the X-ray radiation has traveled. In particular, this allows to identify different parts, tissues and materials within a human body. When the detection or counting of photons is referenced, it is understood, that when a photon impinges on the conversion material of a sensor, it creates a charge pulse (sometimes also referred to as current pulse). This charge pulse is detected and the presence of a photon is concluded. The charge pulse results from a larger number of electron-hole pairs, which are generated, when an X-ray photon interacts with the sensor conversion material. The duration of this charge pulse corresponds to the so-called charge collection time. Detection of single electron-hole pairs is not in the focus of this application, but the processing of a charge pulse resulting from electron-hole pairs representing a photon, which may also be expressed by the formulations "detecting photons" or "counting photons". For a charge pulse, which is generated by interaction of an X-ray photon, also the formulation is used that the charge pulse belongs to this X-ray photon. Along the same lines, e.g. "processing a charge pulse caused by a photon impinging on the sensor" is sometimes also denoted as "processing a photon" in the following.

In order to count single X-ray photons with determining the photon energy, at least one sensor pixel is used which is connected to a counting detector. The counting detector is an electronics circuitry that provides the following functionalities:

a) a preamplifier amplifies and/or integrates the charge pulse resulting from a displacement/movement of charged particles (electrons and holes) in a conversion material, e.g. CZT (cadmium zinc telluride) caused by the incoming photons, b) a shaper (shaping element) which forms a voltage pulse from the output of the preamplifier, the height of the voltage pulse being proportional to the amount of charge carried by the charge pulse, c) a number of discriminators, which check whether the voltage pulse at the output of the shaper is above or below the thresholds defined by each discriminator, and d) for each discriminator a counter, which counts the pulses, that have exceeded the threshold defined by the discriminator.

One of the fundamental challenges of counting X-ray photons e.g. in a computer tomograph is the very high rate of incoming X-ray photons (e.g. in the order of $10^9$ quanta/s·mm$^2$ for the direct beam hitting the detector and considering tube filtration). This means, that within a very small time window an extremely large number of photons has to be discriminated based on their corresponding charge pulses in order to be able to count the photons.

One approach of coping with the large number of photons is to reduce the size of the sensor pixel thereby reducing the number of photons received per pixel. However, given that currently a practical pixel edge length is in the order of 200 µm to 400 µm, the number of photons per pixel still remains too high to allow for a correct counting.

Another issue that has to be dealt with is related to leakage (or dark) currents that are present when a direct converting material is run at a high reverse bias voltage. The leakage current must be stopped from entering the preamplifier, since otherwise the preamplifier will become overloaded and can no longer form voltage pulses.

For the special case of micro-strip counting detectors an AC (alternating current) coupling capacitor arranged between the sensor and the shaper, blocks the leakage current from entering the preamplifier input. However, in order to represent a very low impedance for the time-varying "AC" current, which results from the sequence of charge pulses generated by X-ray photon interaction with the sensor material, the capacitor must be big and therefore is not convenient or not practical for detectors having a pixel size as mentioned before.

Instead, attempts have been made to include some circuitry for leakage current compensation (LCC), which can be built within the pixel to drain the sensor's leakage current.

Coming back to the counting detector, a prominent issue is the so-called paralysis of the counting detector. This term describes the situation, when a second photon is coming in while the preamplifier is still processing a first photon. This means, that the occurrence of the second photon falls within the processing time (which is determined by the shaping time) of the first photon. This results in a voltage pulse being formed, which is considerably longer in time than what the voltage pulse would have looked like, if the first photon had been processed alone.

In addition, further charge pulses, which come in during the ongoing processing will further increase the duration of the voltage pulse at the output of the preamplifier. Consequently, the counting detector sees a combined voltage pulse, with an increased duration compared to the duration if only the first photon had been processed. The voltage pulse may even become so broad, that, although the very first and the very last photon in a sequence of photons are more than the processing time for a photon apart from each other, these photons cannot be distinguished. A further disadvantage of the pulse pile-up described above is that the combined voltage pulse of subsequent photon events is higher than any of the single pulses. If this effect enables the pulse to exceed a discriminator threshold, a false event is registered.

As a result, only one photon can be counted, even though more photons have actually interacted with the sensor material. Hence, the counting detector is paralyzed by subsequent charge pulses which arrive shortly after each other during the processing time of a single photon. The time, during which the detector is not able to discriminate further photons, since it is occupied by processing a photon, is also called the dead-time of the counting detector. The dead-time behavior described above is often also called paralyzable or extendable dead-time.

It should be noted, that it is possible to build preamplifiers and shapers which can process signals at a higher speed. However, such would compromise the noise figures and worsen the ballistic deficit leading to a deterioration of the energy information. For details on the term "ballistic deficit", cf. G. Knoll, "Radiation Detection and Measurement", $3^{rd}$ edition, J. Wiley & Sons, 1999.

One approach on how to address this problem is disclosed in "First Experimental Characterization of ROTOR: the New Switched-Current VLSI Amplifier for X-ray Spectroscopy with Silicon Drift Detectors" by C. Fiorini, A. Pullia, E. Gatti, A. Longoni and W. Buttler, IEEE Transactions on Nuclear Science, Vol. 47, No. 3, pages 823-828, June 2000. It is proposed to filter the sensor signal by using a certain number of processors working in parallel, each one performing a trapezoidal weight function. The weight functions are suitably shifted one with respect to the other in order that for any arrival time of the event, there is always at least one processor that is amplifying the signal with a maximum gain, i.e. the signal occurs in correspondence of the flat-top of its trapezoidal weight function. The outputs of the four processors, called wheels, are sequentially sampled in a common holding capacitor.

SUMMARY OF THE INVENTION

It is an object of the present invention to provide an apparatus for detecting X-ray photons, in particular photons in a computer tomograph, having an improved counting performance. It is a further object of the invention to provide a corresponding method for detecting X-ray photons, in particular photons in a computer tomograph. Other application fields of the invention can be dynamic flat X-ray detectors as used in catheter laboratories e.g. for interventional procedures for heart treatment.

According to one aspect of the invention this object is achieved by an apparatus for detecting X-ray photons, in particular photons in a computer tomograph, comprising an electrical network with a sensor adapted to convert a photon into a charge pulse, with a first preamplifier adapted to convert the charge pulse into an electrical signal with sufficient amplitude for further processing, with a first shaper adapted to convert the electrical signal into an electrical pulse and with a discriminator adapted to compare the electrical pulse against a threshold, wherein an electrical path of the electrical network from an output of the sensor to an output of the discriminator comprises a switching element adapted to be actuated in response to an electrical trigger signal, and wherein the trigger signal is derived from an electrical state of the electrical path, so that the electrical path that has received an electrical signal caused by the photon is disconnected from the sensor after a detection of the photon is indicated by the trigger signal.

According to another aspect of the invention this object is achieved by an imaging device based on the detection of X-ray photons, in particular for medical use, comprising an apparatus as described before. Such an imaging device is in particular embodied as an X-ray machine, a computer tomograph, a device for nuclear medicine techniques (e.g. positron emission tomography or single photon emission computed tomography) or any other radiography device.

According to yet another aspect of the invention this object is achieved by a method for detecting X-ray photons, in particular photons in a computer tomograph, comprising the following steps being performed in an electrical network:
converting a photon into a charge pulse using a sensor,
converting the charge pulse into an electrical signal,
shaping the electrical signal into an electrical pulse,
comparing the electrical pulse against a threshold using a discriminator,
performing a switching operation in an electrical path of the electrical network from an output of the sensor to an output of the discriminator in response to an electrical trigger signal,
wherein the trigger signal is derived from an electrical state of the electrical path, so that the electrical path that has received an electrical signal caused by the photon is disconnected from the sensor after a detection of the photon is indicated by the trigger signal.

While the prior art proposes to use a time-dependent switching, which can cause issues when switching while a photon is being received, the invention proposes to make the switching dependent on the photons being received.

If a photon in general or a photon of a certain energy is received, the switching element is actuated. By actuating the switching element it can be prevented, that the charge pulse caused by a second photon impinging on the sensor flow along the same electrical path as the charge pulse caused by a first photon and cause a mixed extended voltage pulse with the issues described above.

This provides a sufficient time to analyze the first charge pulse belonging to the first photon, since due to the switching element the second charge pulse belonging to the second photon cannot travel the same electrical path as the first charge pulse did. Therefore an improved discrimination of photons is achieved and thereby a more precise counting of photons becomes possible. It should be noted, that the preamplifier and the shaper do not have to be embodied separately and can be embodied as one single element, in particular as a shaping preamplifier.

As described above, the apparatus has an electrical network wherein an electrical path is defined from the output of the sensor to the output of the discriminator. The term "electrical network" is in particular to be understood in the sense, that different electrical components are electrically and functionally connected. This means that the different components are not just linked by a common power source or by a common ground, but that they interact electrically. The term "electrical path" is in particular to be understood in a sense, that an electrical signal is routed—at least in part—from one element to the next along this path.

A switching element in the context of this application is any element with at least one input port and one output port and wherein by actuating the switching element the relationship of the input port and the output port can be changed, e.g. from connected to being disconnected, or in general, to establish a connection between one or more specific input ports to one or more specific output ports. In particular, the switching element provides one input port that can be connected to one of a plurality of output ports. By actuating the switching element the electrical path can be modified, in particular, electrical elements can be connected and/or disconnected.

The trigger signal for actuating the switching element is derived from an electrical state of the electrical path. The term "derived from an electrical state" means in particular, that an electrical potential along the electrical path is tapped and the corresponding voltage (or the current) is routed to the switching element or to an element controlling the actuation of the switching element. Since the signal which is derived from the electrical path serves as a trigger, it is not necessary that the signal arrives identically at the switching element. Instead, active and passive elements can be arranged between the tapping point and the switching element.

This includes arranging a comparator between the electrical path and the switching element, so that only a trigger signal above a certain voltage level will actuate the switching element. Also, the requirement of a minimum voltage can be included in the characteristics of the switching element, in particular when the principle on which the switching element bases its functionality requires a certain voltage level for actuation (e.g. minimum voltage at the gate of a field effect transistor or minimum voltage to engage a relay).

Deriving the trigger signal from the electrical path allows to actuate the switching element depending on whether any signal at all or a signal with a specific amplitude is traveling along the electrical path. In particular, the switching element can be actuated, depending on whether or not a photon impinges on the sensor.

In a preferred embodiment of the invention the trigger signal is derived from a voltage at the preamplifier, preferably at the output of the preamplifier.

This means, when the preamplifier receives the charge pulse caused by a photon impinging on the sensor, a certain level can be defined that indicates the presence of a first photon. The state of the preamplifier is used to detect the presence of a first photon and then to actuate the switching element in order to prevent a further charge pulse, which originates from the interaction of a second photon with the sensor following the first photon, from propagating along the same path as the charge pulse belonging to the first photon. This is beneficial, because since the preamplifier is close to the sensor, this allows for a fast reaction when the presence of a photon is concluded.

In a further preferred embodiment of the invention the trigger signal is derived from a voltage at the discriminator, preferably at the output of the discriminator.

If the voltage pulse arriving at the discriminator exceeds a certain threshold, the discriminator produces an output pulse. This output pulse, which can be counted by a subsequent counter, is used to actuate the switching element. This means, if a voltage pulse is received at the discriminator that fulfills the criteria of being a pulse to be counted (based on the threshold set in the discriminator), such a pulse will be used to actuate the switching element to prevent a following charge pulse belonging to a second photon from propagating along the same electrical path as the charge pulse belonging to a first photon.

This is beneficial, because the trigger signal can be easily derived. It is also possible to tap two or more points along the electrical path and process their electrical states, e.g. in a OR-combination or an AND-combination in order to derive the trigger signal.

In a further preferred embodiment of the invention the switching element is adapted to switch an output of the sensor to the electrical path or to ground.

Initially the switching element is typically in a state where it connects the output of the sensor to the electrical path, waiting for incoming photons. When a first photon is detected, it is necessary—as previously described—to prevent a charge pulse belonging to a second photon from prolonging the voltage pulse in response to the first photon as seen by the detector and causing incorrect results. To achieve this, the switching element disconnects the output of the sensor from the electrical path and connects it to ground. Since the sensor needs some time to provide the full charge generated by the photon interacting with the sensor, one has to make sure that the sensor output is not disconnected too early from the electrical path, i.e. the preamplifier must be able to integrate the sensor current at least for the duration of the charge collection time.

This means, if a second photon follows quickly after the first photon (but not within the charge collection time of the first photon), the processing of the charge pulse belonging to the first photon is not influenced. Then, when the processing of the first photon is complete or about to be completed, the switching element can switch the output of the sensor back to the electrical path. Now the apparatus is, again, waiting for incoming photons. This is beneficial, because a rather inexpensive solution can be provided. If the second photon interacts with the sensor material during the charge collection time of the first photon, it may not be possible to separate both photons, and both photons appear to represent a single photon.

In a further preferred embodiment of the invention a leakage current compensation (LCC) circuit is connected to the electrical path.

In many cases, semiconductor sensors have to be run with a high voltage in order to set up a sufficiently strong electric field within the sensor. This field is needed for the basic functionality of the sensor in order to separate electrons and holes from each other and to guarantee a fast charge collection/response of the device (sharp current pulse distribution). Due to the high voltage, such sensors can exhibit a considerable DC leakage current, which has to be compensated in such a way that it is not input to the preamplifier.

To address this, in this embodiment, while the first photon is being processed and while the output of the sensor is not connected to the electrical path processing the first photon, a leakage current is fed into the leakage current compensation circuit. This is beneficial, because the leakage current compensation can be easily integrated.

In a further preferred embodiment of the invention the apparatus comprises a sink for alternating currents (AC sink) and the switching element is adapted to switch an output of the sensor to the electrical path or to the sink.

As described before, a capacitor can be used as an AC sink. However, given the limited pixel area, a capacitor is not convenient or cannot be used. Therefore, an AC sink is proposed, that is connected to the output of the sensor, while the sensor is disconnected from the electrical path processing the first photon. This is beneficial, because a leakage current of the sensor can be compensated, if required.

In a further preferred embodiment of the invention the sink is embodied as a shaper.

This embodiment opens up the possibility to process charge pulses coming in from the sensor while the sensor is disconnected from the electrical path processing the first photon. Thus, a second photon quickly following the first photon can be processed in a different part of the electrical network than the first photon. When the processing of the first photon is complete, the output of the sensor can be switched back to the electrical path that processed the first photon. This is beneficial, because information regarding a subsequent photon can be obtained.

In a further preferred embodiment of the invention the trigger signal is routed via a time delay element.

Due to the nature of the distribution of electron-hole pairs causing a charge pulse a situation could occur, in which the output of the sensor is disconnected from the electrical path while charges belonging to the photon are still coming in. This reduces the amplitude of the voltage pulse in comparison to the true amplitude if all charges belonging to the photon were considered. This again could lead to the situation that the discriminator does not detect the photon, because, due to only a portion of the charge pulse being considered, the required threshold may not be exceeded.

Therefore, even when the presence of a photon is indicated along the electrical path (by a charge pulse, an electrical signal or a voltage pulse), a time delay is introduced before the switching element is actuated. The time delay is set to a value that corresponds to the time in which a significant percentage of the charge pulse, which originates from the interaction of a single photon with the sensor material, have been collected. The specific value, e.g. 75%, 90% or 95% of the charge pulse, can be determined based on the statistical model underlying the principle of X-ray conversion in the chosen sensor material or can be determined in an experimental set-up. The time that is set to collect a sufficient amount of the charge pulse, is referenced as charge collection time in the following.

It may be advantageous to set the time delay to the charge collection time of the biggest possible charge pulse, which corresponds to the highest energy, which an impinging photon can have. This highest energy is, e.g. determined by the operating voltage of the X-ray tube, which is used to generate the X-ray photons as used in a computer tomograph or a flat detector for dynamic or static X-ray imaging.

This preferred embodiment is beneficial, because it increases the accuracy of counting photons.

In a further preferred embodiment of the invention the time delay element exhibits a different delay if a positive ramp or a negative ramp is received.

The term "ramp" includes steep ramps, and edges. Using this embodiment the time delay element can exhibit a different behavior, if a photon is detected in contrast to when a photon is no longer detected. As explained before, it is desirable to let some time pass (the charge collection time) before the output of the sensor is disconnected from the electrical path into which the charge pulse belonging to the first photon was sent. However, this delay may not be necessary at all or not be necessary to the same degree, when the end of the charge pulse belonging to the first photon is detected. Since this end preferably indicates the availability of the electrical path that processed the first photon, it may be preferred to switch back without waiting for the time period defined by the charge collection time to pass.

In a further preferred embodiment a logic element is arranged between the electrical path and the switching element which is adapted to connect the trigger signal to the switching element when the trigger signal goes above a first voltage level.

This embodiment can be employed, in case it is not desired to apply the trigger signal directly to the switching element. If the first voltage level is exceeded, the trigger signal is applied to the switching element, otherwise the trigger signal is blocked. This is beneficial, because a defined level for actuating the switching element can be set.

In a further preferred embodiment the logic element is adapted to disconnect the trigger signal from the switching element when the trigger signal goes below a second voltage level.

This allows to define a second voltage level related to disconnecting the trigger signal from the switching element when the trigger signal is currently connected to the switching element. This is beneficial, because the behavior of the switching element can be controlled in more detail. A distinction can also be made as to whether the logic element receives a rising edge or a falling edge.

In a further preferred embodiment of the invention the electrical network further comprises at least a second shaper and the switching element is adapted to switch the first shaper or the second shaper, or even further shapers into the electrical path.

The shaper requires a certain time period to process the first photon. As described above, if a second photon is received during this processing time, the photons cannot be discriminated anymore. In this embodiment, the output of the sensor is switched to the second shaper, when the first photon has been received and is being processed by the first shaper. This means, even if a second photon comes in shortly after the first photon, the charge pulse belonging to the second photon are routed to the second shaper which is available for processing the second photon without influencing the processing of the first photon.

Furthermore it is possible to add more shapers which are connected to the output of the sensor (or the output of the preamplifier) via the switching element so that even if one, two or more shapers are currently processing a respective photon, there is still an additional shaper available to accept the next incoming photon.

Many different schemes for switching between the shapers can be implemented. For example, three shapers can be alternated in the sequence 1-2-3-1-2-3-1 etc. or 1-2-3-2-1-2 etc. It is also possible to define a priority for one or more specific shapers, e.g. shaper 1, so that whenever this shaper is available the next incoming photon is routed to this shaper. This could for example result in a sequence 1-2-1-2-3-1 etc.

In a further preferred embodiment of the invention the first preamplifier is associated with the first shaper, the electrical network further comprises at least a second preamplifier being associated with the second shaper and the switching element is adapted to switch one of the first preamplifier/the first shaper and the second preamplifier/the second shaper into the electrical path.

The use of a plurality of shapers has considered that the shaper requires a certain processing time during which it should not receive any further charge pulses. Since the preamplifier also has a certain processing time, it is advantageous to expand the concept of switching between different shapers to switching between different circuit blocks each implementing a preamplifier and a connected shaper. Therefore, if the processing of one photon is currently occupying one circuit block of preamplifier and shaper, the switching element can switch the electrical path to another circuit block of preamplifier and shaper so that the next incoming photon can be processed appropriately.

Furthermore, in order to improve the performance and the quality of the signal processing a shaping preamplifier, combining the functions of the preamplifier and the shaper, can be employed.

In this improved embodiment, the sensor is switched between at least two shaping preamplifiers so that the sensor is at any one time always connected to one shaping preamplifier. Switching the sensor from one shaping preamplifier to another shaping preamplifier is done, for example, after both the output voltage of the one shaping preamplifier has exceeded the threshold (which indicates that a photon of at least the minimum energy of interest has interacted with the sensor) and a certain time (e.g. the maximum expected charge collection time) has expired after passing the threshold, such that one can be sure that the complete charge pulse generated by the photon interacting with the sensor has been integrated by the one shaping preamplifier.

In a further preferred embodiment of the invention at least a second discriminator is connected in parallel to the first discriminator, a first counter is connected to the first discriminator and a second counter is connected to the second discriminator and wherein the first discriminator and the second discriminator receive different voltage thresholds corresponding to different photon energies.

This means in particular, that a single discriminator (connected to a counter) behind a first shaping preamplifier is replaced by a number of discriminators, each of which is connected to a counter, in particular a multi-energy discriminator and counter (MEDC), which implement different voltage thresholds corresponding to different X-ray photon energies. These discriminators are connected in parallel, meaning that their respective inputs receive the same signal from the first shaping preamplifier.

Likewise, each discriminator behind the other shaping preamplifiers can be replaced by a number of discriminators, which implement different voltage thresholds corresponding to different X-ray photon energies. It may be advantageous that the number of different thresholds for each MEDC connected to one of the shaping preamplifiers are the same, and that also exactly the same thresholds are chosen for each of the MEDCs.

As mentioned above, switching the sensor from a first shaping preamplifier to a second shaping preamplifier is done in particular, after both the output voltage of the first shaping preamplifier has exceeded the lowest threshold (which indicates that a photon of at least the minimum energy of interest has interacted with the sensor) and a certain time (e.g. the maximum expected charge collection time), e.g. determined by a first timer, has expired after passing the threshold, such that one can be sure that the complete charge pulse generated by the photon interacting with the sensor has been integrated by the first shaping preamplifier.

Likewise, if after switching to the second shaping preamplifier, a further X-ray photon interacts with the sensor and causes a voltage pulse at the output of the second shaping preamplifier, which exceeds the lowest threshold, a second timer is started and expires after e.g. the maximum expected charge collection time has elapsed. On expiry of this timer, the sensor is switched again until the last shaping preamplifier is connected. If the last shaping preamplifier has to be disconnected, the sensor may be connected to just an AC sink, until the first shaping preamplifier has fully processed its charge pulse and is again operational, in which case the sensor is again connected to the first shaping preamplifier. It can be detected that the first shaping preamplifier is again operational by detecting that the output voltage of the first shaping preamplifier is again below a further threshold, which may usually be considerably lower than the threshold representing the minimum photon energy of interest used in the MEDCs.

It may be advantageous to reconnect the first shaping preamplifier to the sensor only after all other shaping preamplifiers have once been connected, even if the first shaping preamplifier has already processed its charge pulse and is again operational.

In an arrangement with at least two shaping preamplifiers (and subsequently connected MEDCs) and an AC sink, the first shaping preamplifier is only reconnected to the sensor, if the last timer of the last shaping preamplifier has expired (after it was started, since the output voltage of the last shaping preamplifier exceeded the minimum threshold) and the first shaping preamplifier is again operational. If the first shaping preamplifier is still processing its charge pulse, when the last timer expires, the sensor is connected or switched to the AC sink (or in case there is no significant leakage current to GND). The sensor is then reconnected to the first shaping preamplifier, as soon as the first shaping preamplifier is again operational.

The AC sink may be replaced by another shaping preamplifier with subsequently connected MEDC, thus also being able to detect photons and discriminate their energies, however with the potential disadvantage that this last component might again suffer from being overloaded, resulting in a weaker accuracy in the number of photons counted and their energy.

These and other aspects of the invention will be apparent from and elucidated with reference to the embodiments described hereinafter.

It is to be understood that the features mentioned above and those yet to be explained below can be used not only in the respective combinations indicated but also in other combinations or as isolated features, without leaving the scope of the present invention.

BRIEF DESCRIPTION OF THE DRAWINGS

Embodiments of the invention are shown in the drawings and will be explained in more detail in the description below with reference to the same, in which.

DETAILED DESCRIPTION OF EMBODIMENTS

Figure 1:
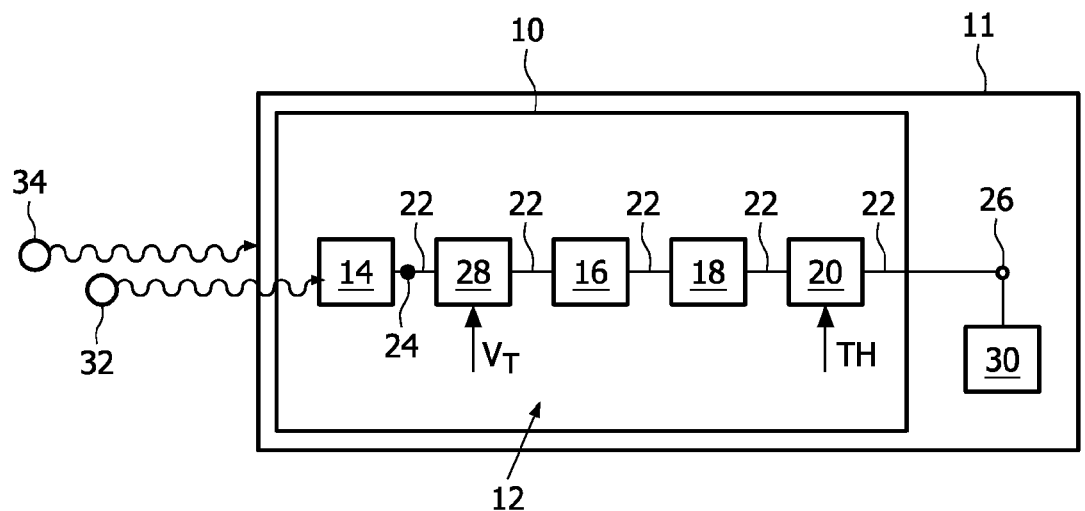
FIG. 1 shows an apparatus for detecting photons in a computer tomograph.

FIG. 1 shows an apparatus 10 for detecting photons 32, 34 in an imaging device based on the detection of X-ray photons, here a computer tomograph 11, comprising an electrical network 12 with a sensor 14 adapted to convert each of the photons 32, 34 into a charge pulse, with a first preamplifier 16 adapted to convert the charge pulse into an electrical signal, with a first shaper 18 adapted to convert the electrical signal into an electrical pulse and with a discriminator 20 adapted to compare the electrical pulse against a threshold, wherein an electrical path 22 of the electrical network 12 from an output 24 of the sensor 14 to an output 26 of the discriminator 20 comprises a switching element 28 adapted to be actuated in response to an electrical trigger signal $V_T$, and wherein the trigger signal $V_T$ is derived from an electrical state of the electrical path 22.

In particular, the sensor 14 is embodied as a photo sensor with a plurality of pixels having a sensor material comprising or being made of CZT and the first shaper 18 is adapted to form the voltage pulse with a rising and a falling edge from an electrical signal being a rising edge. It is possible to combine the first preamplifier 16 and the first shaper 18 into a shaping preamplifier, which generates a voltage pulse from the charge pulse stemming from an impinging photon.

In this embodiment the output 26 of the discriminator 20 is connected to a counter 30. The apparatus 10 enables the counter 30 to count the photons 32, 34 impinging on the sensor 14. The photons 32, 34 are—of course—only shown in a schematic representation, wherein each photon 32, 34 creates a statistically distributed number of electron-hole pairs when impinging on the sensor 14, which electron-hole result in a charge pulse.

Briefly stated, it is the function of the apparatus 10 to provide voltage pulses to the counter 30 which represent the incoming photons 32, 34 in such a manner, that the incoming photons 32, 34 are counted correctly. It is of course also possible, to count the number of photons having an energy above, below or within certain thresholds. The details as to how the apparatus 10 achieves this will be explained in detail in the following.

Figure 2:
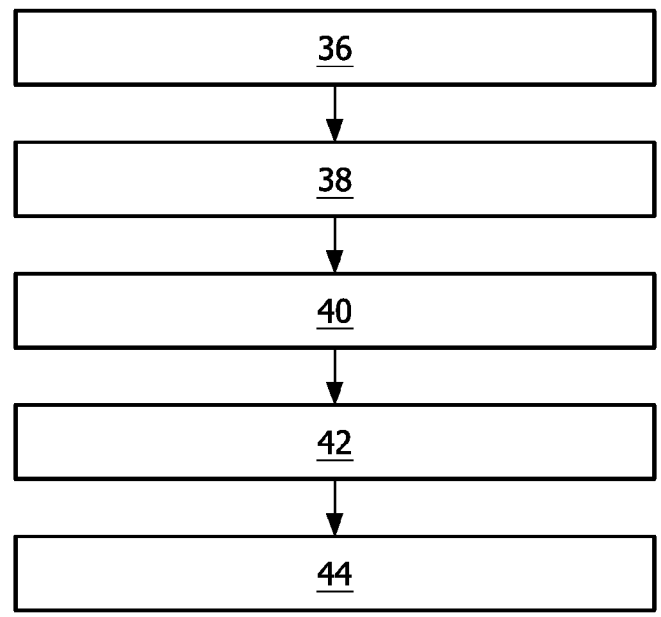
FIG. 2 shows a method for detecting photons in a computer tomograph.

FIG. 2 shows the steps of a method for detecting photons in a computer tomograph 11. In step 36 each of the incoming photons 32, 34 are converted into a charge pulse using the sensor 14. In step 38 the charge pulse is converted into an electrical signal. In the embodiment according to FIG. 1 this is achieved by the preamplifier 16.

In step 40 the electrical signal is shaped into an electrical pulse. In the embodiment according to FIG. 1 this is achieved by the shaper 18. In step 42 the electrical pulse is compared against a threshold TH using the discriminator 20.

In step 44 a switching operation in the electrical path 22 of the electrical network 12 is performed in response to the electrical trigger signal $V_T$, wherein the trigger signal $V_T$ is derived from an electrical state of the electrical path 22. In the embodiment according to FIG. 1 this is achieved by the switching element 28.

Figure 3:
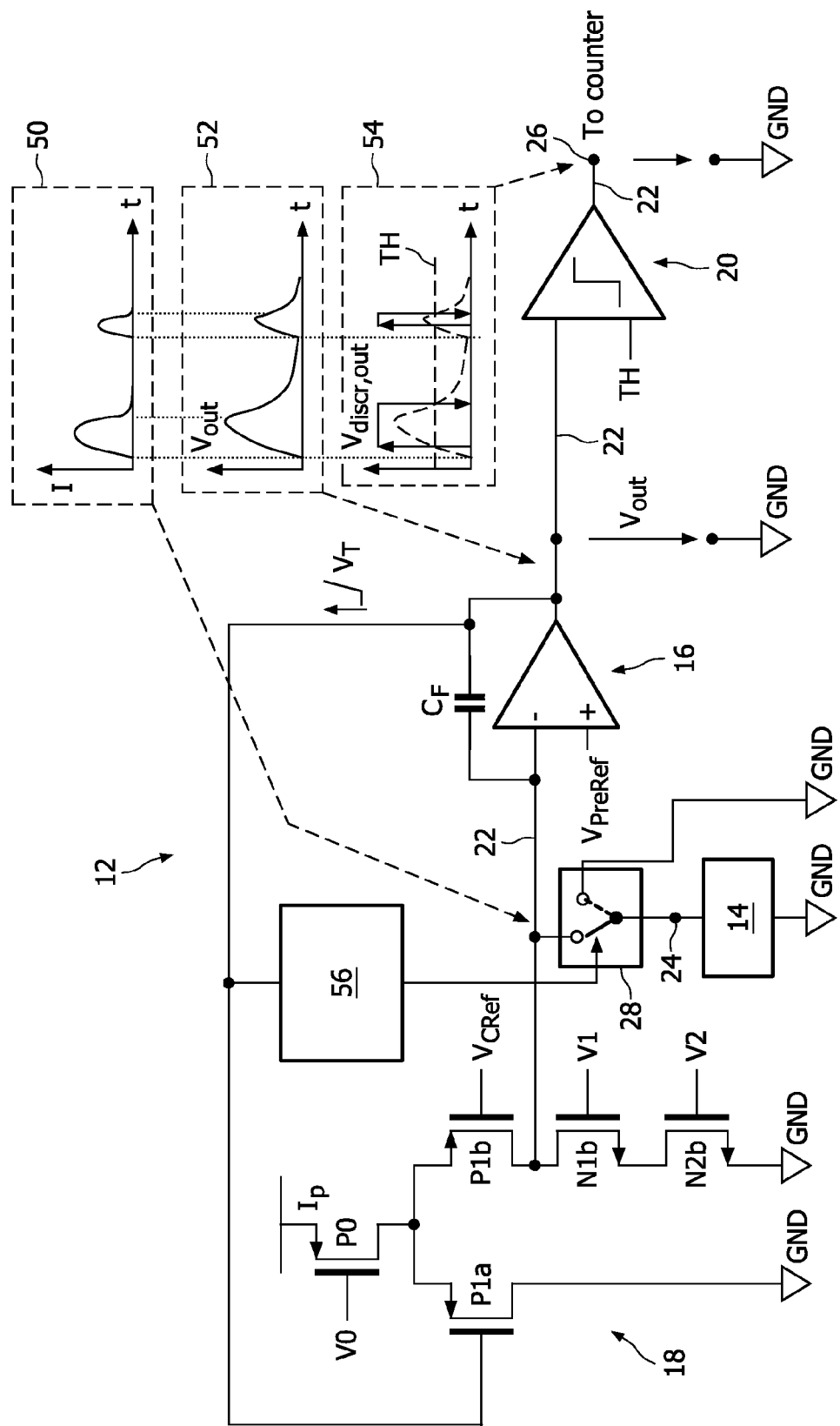
FIG. 3 shows a first embodiment of the electrical network of the apparatus according to FIG. 1.

FIG. 3 shows a first embodiment of the electrical network 12 of the apparatus 10 according to FIG. 1. For those elements, that are identical or perform the same function the same reference numerals are used. In the following the functionality of the electrical network 12, especially with regards to the interaction between the preamplifier 16 and the shaper 18 are described. It is noted, that the term "shaper" is not limited to the typical combination of high-pass- and low-pass-filter following the preamplifier, but includes in particular the arrangement of the circuitry shown in FIG. 3 and subsequent figures, where a shaping element embodied as a modified differential pair implements, together with the preamplifier 16, a shaping preamplifier.

The FETs (field effect transistors) N1b and N2b, in particular embodied as n-MOSFETs (metal-oxide-semiconductor field effect transistors), receive the gate voltages V1 and V2 respectively and are designed to form a current source enforcing a current of $I_p/2$. The FET P0, receiving the gate voltage V0, drains the current $I_p$. The FETs P1a and P1b, in particular embodied as p-MOSFETs, are designed to have exactly the same geometry, wherein FET P1b receives the gate voltage $V_{CRef}$. If no signal is received from the sensor 14, the FETs P1a and P1b drain the same current $I_p/2$.

Due to the interaction of a photon 32, 34 with the material of the sensor 14, in particular CZT, negative charges are generated in the sensor 14. The amount of these charges is proportional to the energy of the photon 32, 34. The negative charges form a pulse and flow onto the left plate of a feed back capacitance $C_F$. The graphic 50 shows the currents generated by a first photon 32 and a subsequent second photon 34.

Since the preamplifier 16 tries to regulate its output voltage such that the potential difference between the inverting input and the non-inverting input (receiving the voltage $V_{PreRef}$) is zero, the output voltage $V_{out}$ increases according to the integral of the current coming in.

The increased output voltage is fed back to the gate of the FET P1a and causes FET P1a to drain less than $I_p/2$, so that the surplus current has to be drained via P1b.

Since the FETs N1b and N2b enforce the current of $I_p/2$, the surplus current (which is per definition carried by positive charges) has to leave the right branch of the modified differential pair and, due to the very high input resistance of the preamplifier 16, can only flow onto the left plate of $C_F$, thereby eliminating the negative charges on the left plate of $C_F$.

This means that the output voltage $V_{out}$ of the preamplifier 16 takes the form of a voltage pulse (shown in graphic 52), the height of which is a measure for the number of charges generated in the sensor 14 and therefore a measure of energy of the quantum, that interacted with the material of the sensor 14.

The voltage pulse is strong enough to be processed by the discriminator 20 which defines a threshold TH. If the pulse is high enough so that the threshold TH is exceeded, the discriminator 20 generates a counting voltage impulse $V_{discr, out}$, initiated with a rising edge, which has an amplitude of the supply voltage (often called $V_{DD}$). The graphic 54 shows the response of the discriminator 20 depending on whether the threshold TH is exceeded or not. As shown in FIG. 1, this counting impulse feeds a counter 30.

While in this example, the first and the second photon are sufficiently spaced in time in order to be separately counted, a situation can occur, where the second photon quickly follows the first photon, so that without having the benefits of the invention available, the voltage pulses belonging to the first and second photons 32, 34 would get combined into one extended pulse. This means, while actually two photons 32, 34 have impinged on the sensor 14, the counter 30 would only receive one pulse from the discriminator 20. The situation would worsen, when more photons 32, 34 follow in quick sequence, leading to an even more extended pulse and more counts missed by the counter 30.

In order to address this problem, the invention proposes the switching element 28 which can modify the electrical path 22 between the output 24 of the sensor 14 and the output 26 of the discriminator 20. The functionality of the switching element 28 is as follows:

When the first photon 32 impinges on the sensor 14, the individual charge pulse generated by the photon 32 are formed into an electrical signal by the preamplifier 16. This activity is sensed by a control element 56, which is connected to the output of the preamplifier 16. The control element 56 is adapted to switch the switching element 28 if the generation of an electrical signal in the preamplifier 16 is sensed, in particular if the electrical signal exceeds a certain voltage level.

Given the current assumption, that an electrical signal is generated in the preamplifier 16 due to the first photon 32 having impinged on the sensor 14, the control element 56 switches the switching element 28, so that the output 24 of the sensor 14 is disconnected from the input of the preamplifier 16.

Therefore, even if the second photon 34 follows quickly after the first photon 32, the charge pulse stemming from the second photon 34 does not reach the preamplifier 16 and cannot interfere with the processing of the charge pulse of the first photon 32. In this embodiment, the switching element 28, when actuated, switches the output 24 of the sensor 14 to ground GND.

This does not necessarily mean, that the information regarding the second photon 34 is lost, because when the processing in response to the first photon 32 is completed, the control element 56 switches the switching element 28 back into its original position, meaning that the output 24 of the sensor 14 is reconnected with the input of the preamplifier 16.

At this time, further charge pulse can reach the preamplifier 16. Typically this means, that not all charges in the charge pulse generated by the second photon 34 are lost, so that a processing and a detection of the second photon 34 is still possible.

It should be emphasized, that even if the information regarding a photon were lost, the fact that the apparatus 10 cannot be paralyzed still brings a significant advantage.

The threshold according to which the control element 56 detects the processing of an electrical signal can be determined based on the specific needs of a specific application. Also, it can be beneficial to define two different thresholds, one for the detection of the beginning of the processing of an electrical signal (rising edge) and one for the detection of the end of processing an electrical signal (falling edge). Furthermore, a time delay can be implemented as will be explained in detail with reference to FIGS. 5 and 6. The simplest processing element 56 may be embodied as a further discriminator.

In summary, the apparatus 10 is made non-paralyzable by blocking the preamplifier 16 from receiving further charge pulses from the sensor 14, while preamplifier 16 is processing a photon 32, 34. Since the preamplifier 16 is functionally associated with the shaper 18 it can be said, that the preamplifier 16 and the shaper 18 shape the output voltage for a charge pulse.

Figure 4:
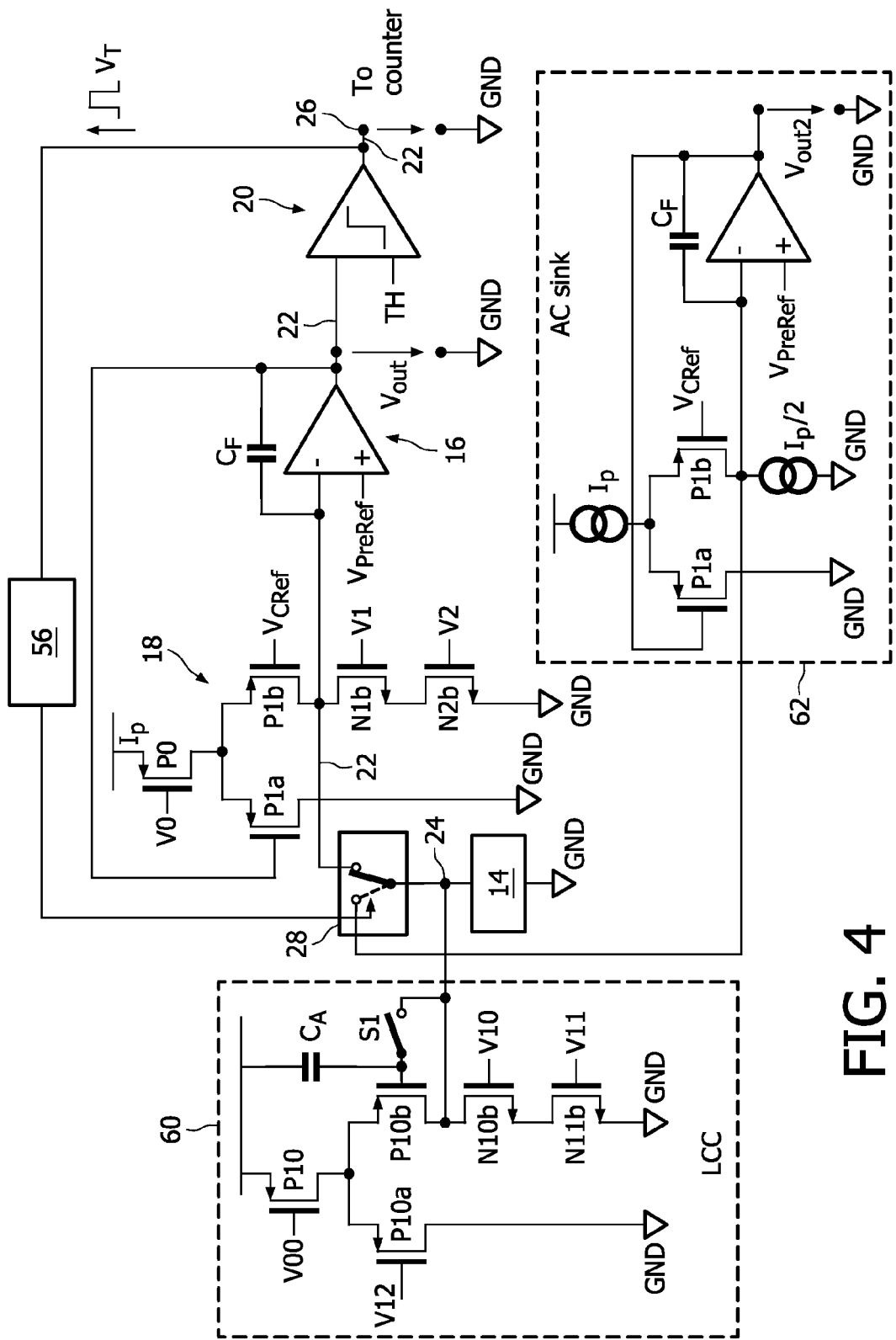
FIG. 4 shows a second embodiment of the electrical network of the apparatus according to FIG. 1.

FIG. 4 shows the electrical network 12 of FIG. 3 with a slight modification and further a leakage current compensation (LCC) circuit 60 and an AC sink 62.

The modification of the electrical network 12 according to FIG. 3 is represented in a different connection of the control element 56 to the electrical path 22. In this case, the trigger signal is derived from a voltage at the output 26 of the discriminator 20. In this embodiment the activity of the switching element 28 is linked to the actual detection by the discriminator 20 of a pulse to be counted.

In this embodiment the LCC circuit 60 is connected to the output 24 of the sensor 14 and the AC sink 62 is connected to the switching element 28 such that when the switching element 28 disconnects the output 24 of the sensor 14 from the electrical path 22, the output 24 of the sensor 14 is connected to the AC sink 62. The functionality of this embodiment is explained as follows.

The LCC circuit 60 is configured to drain the DC leakage current of the sensor 14. In order to achieve this, the switch S1 is closed. It should be noted, that the DC current cannot be drained via the preamplifier 16, because the capacitance $C_F$ represents an interruption for a DC current. The DC current can neither be drained via the right-hand branch of the FETs N1$b$, N2$b$ of the differential pair. Therefore, the DC current is drained via the right-hand branch of FETs N10$b$, N11$b$ of the modified differential pair of the LCC circuit 60. The gate voltage of the FET P10$b$ takes on the necessary value. (It should be noted, that this is the gate voltage, which can be set by the leakage current.)

After the transient phase, in which the gate voltage is determined, the sensor leakage current is drained via the LCC circuit 60. In order to allow for a detection of photons, the switch S1 is opened. Still, the required gate voltage of FET P10$b$ is maintained by the capacitor $C_A$, so that the leakage current is still drained via the LCC circuit 60.

Whenever the preamplifier 16 and the shaper 18 process a photon, the switching element 28 is switched to connect the sensor 14 to the AC sink 62. When the processing of the photon is finished, the switching element 28 reconnects the sensor 14 to the preamplifier 16 (and the shaper 18) so that a further photon can be processed.

It is advantageous, if the AC sink 62 is embodied as a shaper, because this opens up the opportunity, to count a photon coming in, while the output 24 of the sensor 14 is disconnected from the electrical path 22.

Figure 5:
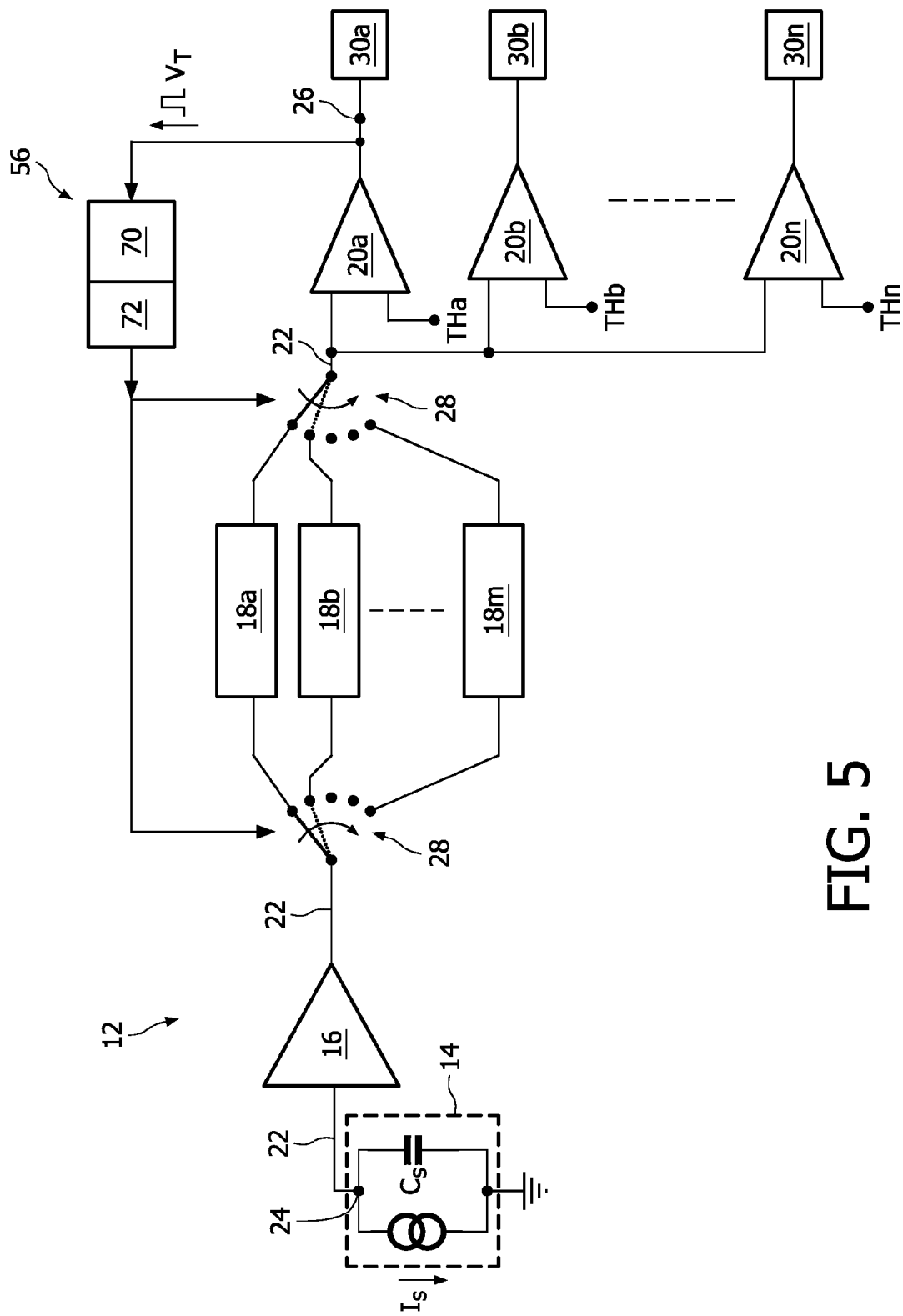
FIG. 5 shows the key elements of a third embodiment of the electrical network of the apparatus according to FIG. 1.

FIG. 5 shows a third embodiment of the invention. It should be noted that this is a simplified representation of the key elements related to this embodiment.

In this figure, the sensor 14 is represented as a current source with a current $I_S$ parallel to a capacitance $C_S$. The switching element 28 is embodied as two switches which are actuated simultaneously and allows to connect one of a plurality of shapers 18$a$, 18$b$, . . . 18$m$ into the electrical path 22. In addition, this embodiment contains a plurality of discriminators 20$a$, 20$b$, . . . 20$n$ being connected in parallel. The discriminators 20$a$, 20$b$, . . . 20$n$ have thresholds THa, THb, . . . THn respectively in order to detect photons 32, 34 at different energy levels. Individual counters 30$a$, 30$b$, . . . 30$n$ are connected to the discriminators 20$a$, 20$b$, . . . 20$n$ respectively. The control element 56 comprises a time delay element 70 and a logic element 72. The functionality of this electrical network 12 is as follows.

Initially it is assumed, that the switching element 28 is in the position shown by the solid line, connecting the shaper 18$a$ into the electrical path 22. If a first photon 32 impinges on the sensor 14, the charge pulse is converted into an electrical signal by the preamplifier 16 and are routed to the shaper 18$a$ to be converted into a voltage pulse.

During the processing of the electrical signal into a voltage pulse, the threshold THa of the discriminator 20$a$ (which has the lowest threshold among all discriminators) will be exceeded and a signal is provided at the output 26 of the discriminator 20$a$.

This trigger signal $V_T$ reaches the time delay element 70 of the control element 56. The time delay element 70 serves to delay the signal coming from the output 26 of the discriminator 20$a$ for a certain amount of time. Since an immediate actuation of the switching element 28 would likely cut off the energy belonging to the first photon 32, the time delay element waits for a time that is sufficient to gather all the charges (or most of them) originating from the first photon 32. This time delay is called charge collection time. Since this time may be higher for photons with a higher energy, it can be advantageous to set the time delay such that the longest charge collection time is still taken into account.

The delayed pulse from the discriminator 20$a$ then reaches the logic element 72, which compares the amplitude of the trigger signal $V_T$ to a certain threshold and trigger signal $V_T$ for actuation of the switching element 28, if that threshold is exceeded. Of course it is also possible that the logic element 72 generates its own output signal based on the trigger signal $V_T$.

In this embodiment, actuating the switching element 28 means, that both sides of the switching element 28 take on the position as indicated by the dotted lines. This means, that the shaper 18$a$ is disconnected and that the shaper 18$b$ is connected into the electrical path 22.

Since the shaper 18$a$ is now disconnected, it can now go back to its base line to become ready for correctly processing the next pulse that is routed to this shaper 18$a$.

During the time window, in which the shaper 18$a$ is not yet available again for correctly processing a photon, a second photon 34 is processed by the shaper 18$b$. Depending on the rate at which photons 32, 34 have to be processed, it is possible that one, two or more shapers are not available—because a photon is being processed or because they are in the process of returning to their base line—so that more shapers can be employed as necessary as shown in this embodiment.

Figure 6:
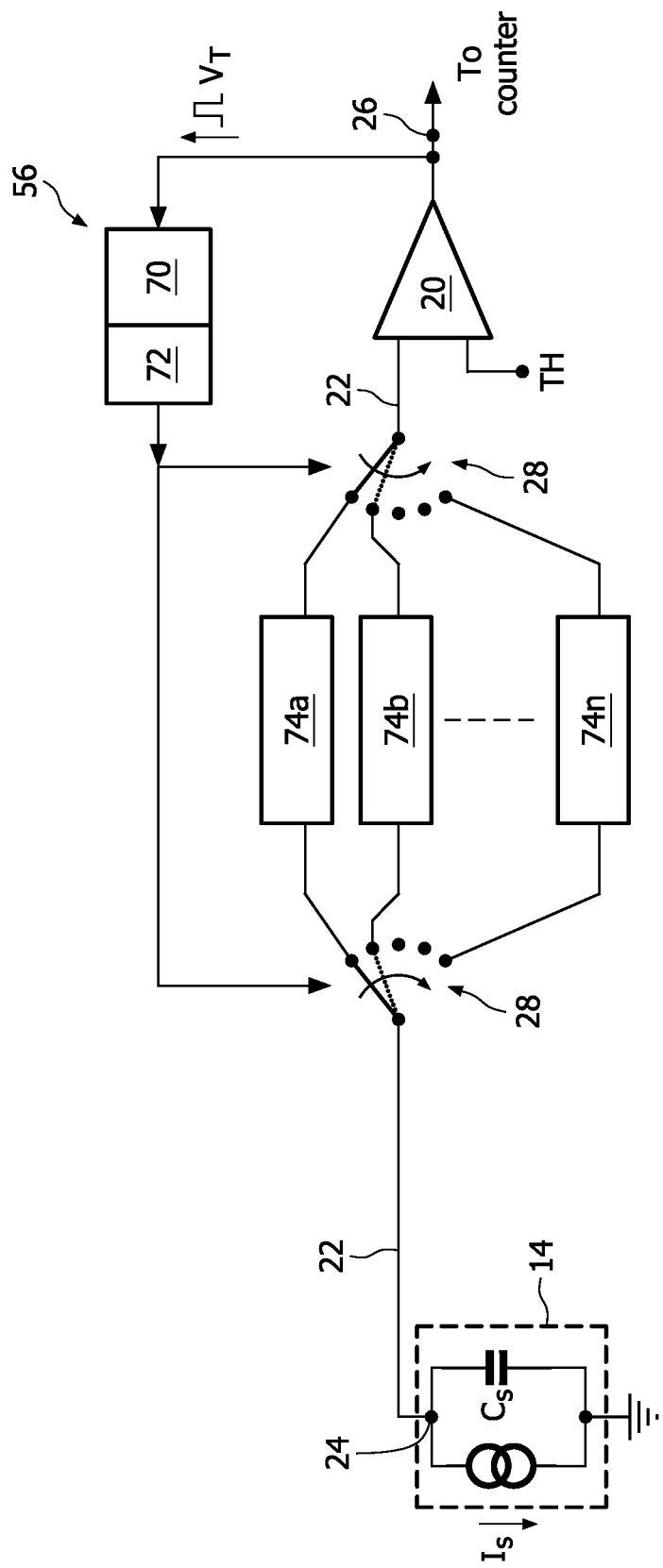
FIG. 6 shows the key elements of a fourth embodiment of the electrical network of the apparatus according to FIG. 1.

FIG. 6 shows a fourth embodiment of the invention. The basic functionality of this embodiment is the same as in the embodiment of FIG. 5 and reference is made to FIG. 5 in this respect.

The key difference over FIG. 5 are the shaping preamplifiers 74a, 74b, . . . 74n, wherein each of them combines a preamplifier 16 and a shaper 18 according to the previous figures.

Depending on the rate of impinging photons 32, 34 it is possible that the preamplifier 16 according to the previous figures receives a charge pulse belonging to a second photon 34 while processing the charge pulse associated to a first photon 32. In order to avoid this situation, the plurality of shaping preamplifiers 74a, 74b, . . . 74n is provided wherein each of them can be switched individually into the electrical path 22.

This means, as soon as a first photon 32 is detected and the charge collection time has passed, the currently used shaping preamplifier 74a is disconnected and an available shaping preamplifier 74b is switched into the electrical path 22. The shaping preamplifier 74a, now disconnected from the electrical path 22, has a sufficient time window to return to its base line and to become ready to process a charge pulse belonging to a subsequent photon that is routed to this shaping preamplifier 74a.

The single discriminator in FIG. 6 may be replaced by a number of parallel connected discriminators as shown in FIG. 5 resulting in an energy discriminating counting detector.

Figure 7:
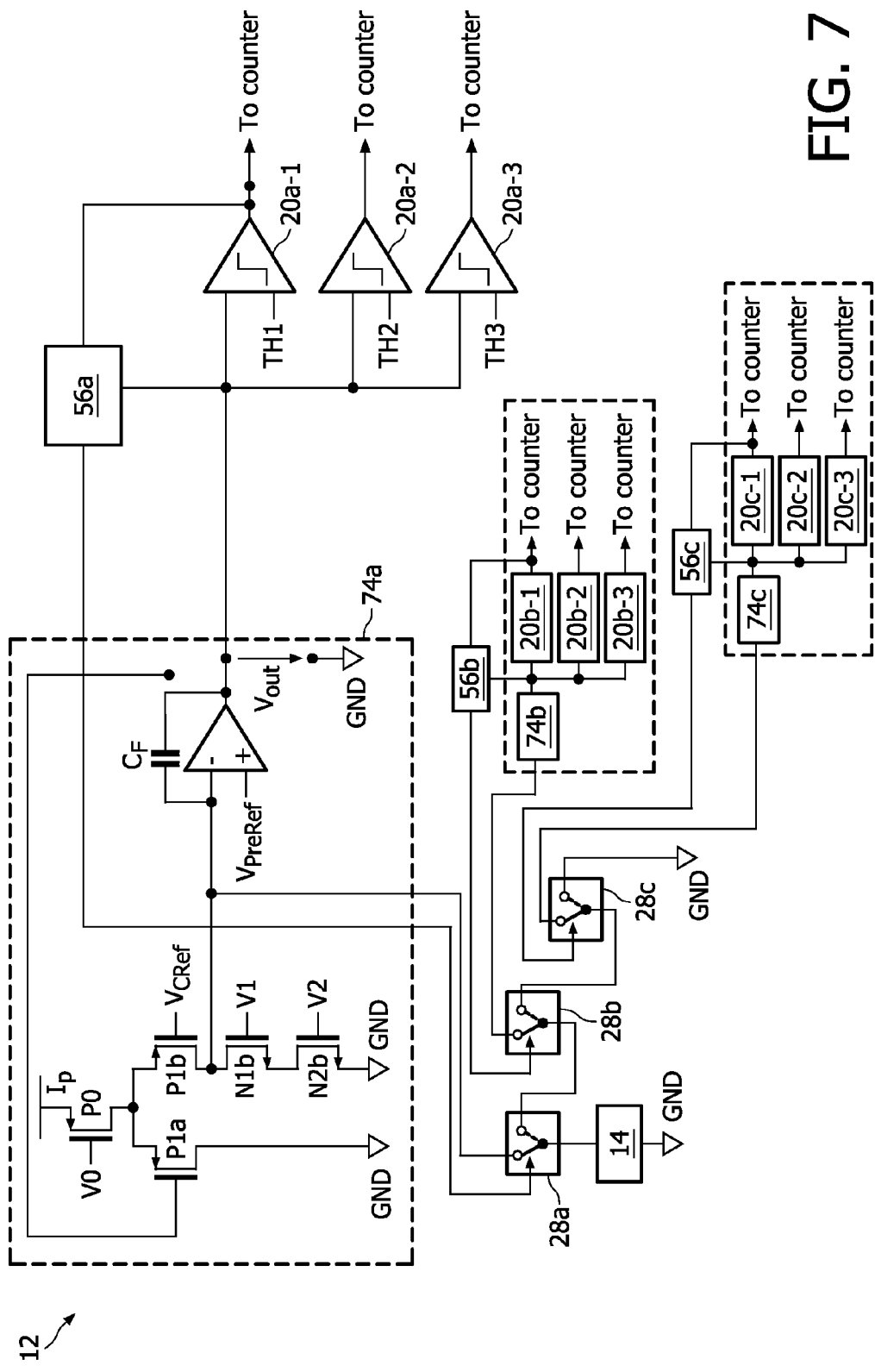
FIG. 7 shows a fifth embodiment of the electrical network of the apparatus according to FIG. 1, allowing to build an energy discriminating counting detector.

FIG. 7 shows a fifth embodiment of the invention, representing an energy discriminating counting detector, in which the sensor can be switched between three shaping preamplifiers (74a, 74b, 74c) each connected to three discriminators 20a-1, 20a-2, 20a-3 for 74a, 20b-1, 20b-2, 20b-3 for 74b, and 20c-1, 20c-2, 20c-3 for 74c. The shaping preamplifier 74a is shown in all details, while the two other shaping preamplifiers 74b and 74c are only represented as blocks. It is assumed that for the three thresholds TH1, TH2, and TH3 the relation TH1<TH2<TH3 holds, i.e. TH1 corresponds to the minimum interesting energy of photons. The thresholds of the other discriminators are not shown in FIG. 7, but it is assumed that discriminators 20b-1 and 20c-1 also have threshold TH1, discriminators 20b-2 and 20c-2 also have threshold TH2, and discriminators 20b-3 and 20c-3 also have threshold TH3. Hence, the control blocks 56a, 56b, and 56c are all connected to the output of the discriminators, which implement the lowest energy threshold.

There are the switches 28a, 28b, 28c connected in series, by which the sensor can successively be connected to the three different shaping preamplifiers 74a, 74b, or 74c or to GND. At first, the sensor 14 is connected via switch 28a to the input of the first shaping preamplifier 74a. A photon that interacts with the sensor will generate a charge pulse in the sensor, which is (due to the current position of switch 28a) processed by the first shaping preamplifier 74a resulting in a voltage pulse at its output, which is further processed by the three discriminators 20a-1, 20a-2 and 20a-3.

Assuming that the voltage pulse is big enough to exceed threshold TH2, but not TH3, also TH1 is exceeded. This triggers the corresponding counters as well as the control block 56a, in which a timer is started, which expires after the maximum expected charge collection time has elapsed. If it expires, the position of switch 28a is changed so that the sensor 14 is from then on connected the input of switch 28b, which connects the sensor to the input of the shaping preamplifier 74b. The shaping preamplifier's 74a output has then sufficient time to return to the baseline without being affected by further charge pulses originating from further X-ray photons interacting with the sensor.

The next X-ray photon can be processed by the second shaping preamplifier 74b, in the same manner as described for the first shaping preamplifier: As soon as the charge pulse causes the output voltage of shaping preamplifier 74b to exceed the lowest threshold (i.e. here that of discriminator 20b-1), control block 56b is triggered to start a timer, which expires after the maximum expected charge collection time has elapsed, and if it elapses, the position of switch 28b is changed such that the sensor 14 is connected to the input of switch 28c, which further connects the sensor to the input of the shaping preamplifier 74c, which is then ready to process a further X-ray photon.

If processing of this X-ray photon causes the output of the shaping preamplifier 74c to exceed the lowest threshold (here that of discriminator 20c-1), control block 56c is triggered to start a timer, which expires after the maximum expected charge collection time has elapsed. If this timer has expired, control block 56c triggers the switch 28c to change its position such that its input is from then on connected to GND, which causes the sensor 14 to be connected to GND. If in the mean-time the output voltage of the first shaping preamplifier has fallen below a further threshold, which is preferably lower than TH1 (the corresponding discrimination function is incorporated in the control block 56a), which means that processing of the very first photon is finished, control block 56a causes switch 28a to again change its position back to the original one so that the sensor is again directly connected to the first shaping preamplifier 74a.

Likewise, as soon as the output voltage of the second shaping preamplifier 74b has fallen below a further threshold, which is preferably lower than TH1 (the corresponding discrimination function is incorporated in the control block 56b), which means that processing of the second photon is finished, control block 56b causes switch 28b to again change its position back to the original one. From then on, the second shaping preamplifier is ready to be connected to the sensor (via switches 28a and 28b), if the first shaping preamplifier needs to be disconnected.

Similarly, if the output voltage of the third shaping preamplifier 74c has fallen below a further threshold, which is preferably lower than TH1 (the corresponding discrimination function is incorporated in the control block 56c), which means that processing of the third photon is finished, control block 56c causes switch 28c to again change its position back to the original one. From then on, the third shaping preamplifier is ready to be connected to the sensor (via switches 28a, 28b, 28c), if the first and second shaping preamplifier need to be disconnected.

This approach allows for providing a non-paralyzable energy-resolving X-ray detector capable of dealing with significantly increased photon rates. In the simplest version, without the switches 28b, 28c, and the shaping preamplifiers 74b, 74c, switch 28a directly connects to GND, if switch 28a changes its position, and it reconnects the sensor to the shaping preamplifier 74a, if the control block 56a detects from the output voltage of shaping preamplifier 74a that the processing of the photon is finished.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The terms "left", "right", etc. are used only for an eased understanding of the invention and do not limit the scope of the invention.

The mere fact that certain measures are recited in mutually different dependent claims does not indicate that a combination of these measures cannot be used to advantage. Any reference signs in the claims should not be construed as limiting the scope.

The invention claimed is:

1. An apparatus for detecting X-ray photons in a computer tomography scanner, comprising:
an electrical network, including:
a sensor adapted to convert a photon into a charge pulse;
a first preamplifier adapted to convert the charge pulse into an electrical signal;
a first shaper adapted to convert the electrical signal into an electrical pulse;
a first discriminator adapted to compare the electrical pulse against a threshold; and
an electrical path of the electrical network from an output of the sensor to an output of the discriminator, including:
a switching element adapted to be actuated in response to an electrical trigger signal derived from an electrical state of the electrical path, said actuated switching element is adapted to disconnect the sensor from the electrical path after a detection of the photon, which is indicated by the trigger signal, which indicates that the electrical path has received an electrical signal caused by the photon; and
a time delay element that routes the electrical trigger signal to the switching element.

2. The apparatus according to claim 1, wherein the time delay element exhibits a different delay if a positive ramp or a negative ramp is received.

3. The apparatus according to claim 1, wherein a logic element is arranged between the electrical path and the switching element which is adapted to connect the trigger signal to the switching element when the trigger signal goes above a first voltage level.

4. The apparatus according to claim 3, wherein the logic element is adapted to disconnect the trigger signal from the switching element when the trigger signal goes below a second voltage level.

5. The apparatus according to claim 1, wherein the electrical network further comprises at least a second shaper and wherein the switching element is adapted to switch the first shaper or the second shaper into the electrical path.

6. The apparatus according to claim 5, wherein the first preamplifier is associated with the first shaper, the electrical network further comprises at least a second preamplifier being associated with the second shaper and wherein the switching element is adapted to switch one of the first preamplifier/the first shaper and the second preamplifier/the second shaper into the electrical path.

7. The apparatus according to claim 1, wherein at least a second discriminator is connected in parallel to the first discriminator, a first counter is connected to the first discriminator and a second counter is connected to the second discriminator and wherein the first discriminator and the second discriminator receive different voltage thresholds corresponding to different photon energies.

8. A method for detecting X-ray photons in a computer tomography scanner, comprising the following steps being performed in an electrical network:
converting a photon into a charge pulse using a sensor,
converting the charge pulse into an electrical signal,
shaping the electrical signal into an electrical pulse,
comparing the electrical pulse against a threshold using a discriminator,
deriving an electrical trigger signal from an electrical state of an electrical path of the electrical network, wherein the electrical path is from an output of the sensor to an output of the discriminator; and
performing a switching operation in the electrical path in response to the electrical trigger signal routed by a time delay element, wherein the switching operation disconnects the electrical path that has received an electrical signal caused by the photon, from the sensor after a detection of the photon is indicated by the trigger signal.

9. The method of claim 8, wherein the switching element is adapted to switch between a first electrical path and a second electrical path, wherein the first electrical path comprises the first shaper and the second electrical path comprises a second shaper, a sink for alternating currents or a ground.

10. The method according to claim 8, wherein the time delay element exhibits a different delay if a positive ramp or a negative ramp is received.

11. The method according to claim 8, wherein at least a second discriminator is connected in parallel to the first discriminator, a first counter is connected to the first discriminator and a second counter is connected to the second discriminator and wherein the first discriminator and the second discriminator receive different voltage thresholds corresponding to different photon energies.

12. An apparatus for detecting X-ray photons in a computer tomography scanner, comprising:
an electrical network, including:
a sensor adapted to convert a photon into a charge pulse;
a first preamplifier adapted to convert the charge pulse into an electrical signal;
a first shaper adapted to convert the electrical signal into an electrical pulse;
a first discriminator adapted to compare the electrical pulse against a threshold;
at least a second discriminator connected in parallel to the first discriminator, wherein the first discriminator and the at least the second discriminator receive different voltage thresholds corresponding to different photon energies;
a first counter connected to the first discriminator; and
a second counter connected to the second discriminator,
an electrical path of the electrical network from an output of the sensor to an output of the discriminator, including:
a switching element adapted to be actuated in response to an electrical trigger signal derived from an electrical state of the electrical path, wherein the electrical trigger signal indicates that the electrical path has received an electrical signal caused by the photon, and the switching element is adapted to disconnect the sensor from the electrical path after a detection of the photon indicated by the trigger signal.

13. The apparatus of claim 12, further comprising:
a time delay element that routes the electrical trigger signal to the switching element.

14. The apparatus according to claim 13, wherein the time delay element exhibits a different delay if a positive ramp or a negative ramp is received.

\* \* \* \* \*